US012759639B2

(12) United States Patent
Miyazaki et al.

(10) Patent No.: US 12,759,639 B2
(45) Date of Patent: Oct. 13, 2026

(54) ELECTRIC WORK VEHICLE

(71) Applicant: KUBOTA CORPORATION, Osaka (JP)

(72) Inventors: Daisuke Miyazaki, Sakai (JP); Makoto Imaizumi, Sakai (JP); Yasuaki Morioka, Sakai (JP); Haruki Mitsui, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 350 days.

(21) Appl. No.: 18/560,783

(22) PCT Filed: May 17, 2022

(86) PCT No.: PCT/JP2022/020508
§ 371 (c)(1),
(2) Date: Nov. 14, 2023

(87) PCT Pub. No.: WO2023/276472
PCT Pub. Date: Jan. 5, 2023

(65) Prior Publication Data

US 2024/0270318 A1 Aug. 15, 2024

(30) Foreign Application Priority Data

Jun. 29, 2021 (JP) ................................ 2021-107499

(51) Int. Cl.
*B62D 21/18* (2006.01)
*B60K 1/00* (2006.01)
(Continued)

(52) U.S. Cl.
CPC ................ *B62D 21/18* (2013.01); *B60K 1/00* (2013.01); *B60K 1/04* (2013.01); *B62D 49/06* (2013.01); *B60K 2001/0411* (2013.01)

(58) Field of Classification Search
CPC ........ B62D 21/18; B62D 49/06; B62D 49/00; B60K 1/00; B60K 1/04; B60K 2001/0411; E02F 9/0833; E02F 9/0858; E02F 9/207
See application file for complete search history.

(56) References Cited

U.S. PATENT DOCUMENTS 7,735,594 B2 * 6/2010 Hidaka ................ B62D 21/186
180/311
9,586,499 B2 * 3/2017 Fushimi .................. B60K 1/00
(Continued)

FOREIGN PATENT DOCUMENTS

JP 54-36251 U 3/1979
JP S6082490 A 5/1985
(Continued)

OTHER PUBLICATIONS

Translated JP-2000177652-A (Year: 2026).*
(Continued)

*Primary Examiner* — James A Shriver, II
*Assistant Examiner* — Ian Bryce Shelton
(74) *Attorney, Agent, or Firm* — Keating & Bennett, LLP

(57) ABSTRACT

An electric work vehicle includes a battery, a motor to be driven by electric power supplied from the battery, wheels to be driven by the motor, at least one first frame extending in a front-rear direction of a body of the electric work vehicle to support the battery, a motor frame to be coupled to a rear portion of the at least one first frame and support the motor, a second frame extending in the front-rear direction of the body and located rearward of the at least one first frame, and a third frame overlapping the at least one first frame and the second frame in a side view, and coupled to the at least one first frame and the second frame.

9 Claims, 6 Drawing Sheets

(51) Int. Cl.

| | |
|---|---|
| ***B60K 1/04*** | (2019.01) |
| ***B62D 49/06*** | (2006.01) |

(56) References Cited

U.S. PATENT DOCUMENTS

| | | | | |
|---|---|---|---|---|
| 9,649,923 | B2 * | 5/2017 | Perlo | B60K 1/04 |
| 9,941,495 | B2 * | 4/2018 | Naito | B60L 50/71 |
| 10,081,219 | B2 * | 9/2018 | Tomimatsu | B60B 35/006 |
| 10,232,882 | B2 * | 3/2019 | Bertezzolo | B62D 21/14 |
| 2007/0193816 | A1 * | 8/2007 | Hidaka | B62D 49/06 180/374 |
| 2016/0039308 | A1 * | 2/2016 | Fushimi | B60L 50/70 180/65.31 |
| 2016/0347159 | A1 * | 12/2016 | Perlo | B60K 17/348 |
| 2017/0129284 | A1 * | 5/2017 | Tomimatsu | B62D 21/186 |
| 2017/0253271 | A1 * | 9/2017 | Bertezzolo | B62D 63/025 |
| 2017/0256762 | A1 * | 9/2017 | Naito | B60K 1/00 |
| 2020/0207199 | A1 * | 7/2020 | Uemura | B62D 25/08 |
| 2022/0234434 | A1 | 7/2022 | Tottori et al. | |

FOREIGN PATENT DOCUMENTS

| | | | | | |
|---|---|---|---|---|---|
| JP | H0586770 | U | | 11/1993 | |
| JP | 2000177652 | A | * | 6/2000 | |
| JP | 2017024710 | A | * | 2/2017 | |
| JP | 2020-104681 | A | | 7/2020 | |
| JP | 2021-000953 | A | | 1/2021 | |
| WO | WO-2016017606 | A1 | * | 2/2016 | B62D 49/00 |

OTHER PUBLICATIONS

Translated JP-2017024710-A (Year: 2026).*

Official Communication issued in corresponding European Patent Application No. 22832631.0, mailed on Jul. 17, 2025, 9 pages.

Official Communication issued in International Patent Application No. PCT/JP2022/020508, mailed on Jul. 26, 2022.

* cited by examiner

ELECTRIC WORK VEHICLE

BACKGROUND OF THE INVENTION

1. Field of the Invention

The present invention relates to an electric work vehicle including a battery, a motor to be driven by electric power supplied from the battery, and a travel device to be driven by the motor.

2. Description of the Related Art

The electric work vehicle described in JP 2021-953A is known as an example of the above-described electric work vehicle. The electric work vehicle (a "tractor" in JP 2021-953A) includes a first frame (a "main frame" in JP 2021-953A) extending in the front-rear direction of the body of the electric vehicle, and configured to support a battery (a "travel battery" in JP 2021-953A), a motor frame (a "rear portion support frame" in JP 2021-953A) configured to be coupled to a rear portion of the first frame, and support the motor, and a second frame extending in the front-rear direction of the body, and located rearward of the first frame.

Also, a front end portion of the second frame is coupled to the motor frame.

SUMMARY OF THE INVENTION

For a frame structure such as that of the work vehicle described in JP 2021-953A, stress tends to be concentrated on a coupling portion between the first frame and the motor frame.

Preferred embodiments of the present invention provide electric work vehicles that each reduce or prevent concentration of stress on a coupling portion between a first frame and a motor frame, using a relatively simple structure.

An electric work vehicle according to a preferred embodiment of the present invention includes a battery, a motor to be driven by electric power supplied from the battery, a travel device to be driven by the motor, at least one first frame extending in a front-rear direction of a body of the electric work vehicle to support the battery, a motor frame to be coupled to a rear portion of the at least one first frame to support the motor, a second frame extending in the front-rear direction of the body and located rearward of the at least one first frame, and a third frame overlapping the at least one first frame and the second frame in a side view and coupled to the at least one first frame and the second frame.

With this configuration, the first frame and the second frame are coupled to each other via the third frame. Accordingly, stress is less likely to be concentrated on a coupling portion between the first frame and the motor frame as compared with a case where the electric work vehicle does not include the third frame and has a frame structure in which a front end portion of the second frame is coupled to the motor frame.

Therefore, with this configuration, it is possible to realize an electric work vehicle that can reduce or prevent concentration of stress on a coupling portion between the first frame and the motor frame, using a relatively simple configuration.

Furthermore, it is preferable that a front end portion of the second frame is coupled to the motor frame.

With this configuration, the first frame and the second frame are coupled to each other via the motor frame. This makes it possible to reduce or prevent concentration of stress on a coupling portion between the first frame and the third frame, and a coupling portion between the second frame and the third frame.

Furthermore, it is preferable that the electric work vehicle further includes a gear case located rearward of the motor frame, and coupled to the motor frame, wherein the gear case houses one or more gears each being rotatable by a driving force of the motor, and the front end portion of the second frame is coupled to the motor frame via the gear case.

Generally, for an electric work vehicle including a gear case, the gear case has a relatively high strength.

With this configuration, a front end portion of the second frame is coupled to the motor frame via a gear case having a relatively high strength. Accordingly, the state of coupling between the front end portion of the second frame and the motor frame can be easily stabilized.

Furthermore, it is preferable that the electric work vehicle further includes a first fastener and a second fastener to fasten the front end portion of the second frame to the gear case, wherein the first fastener and the second fastener have axial directions different from each other.

This configuration enables the directions of stress acting on the respective fasteners to be dispersed more easily as compared with a configuration in which the plurality of fasteners configured to fasten the front end portion of the second frame to the gear case all have the same axial direction. Accordingly, the state of coupling between the front end portion of the second frame and the motor frame can be more easily stabilized.

Furthermore, it is preferable that the at least one first frame includes a plurality of first frames, the plurality of first frames include two first frames arranged in the left-right direction of the body, and the electric work vehicle further includes a bottom plate coupled to the two first frames to extend across a lower portion of the left first frame and a lower portion of the right first frame.

With this configuration, the frame structure including the two first frames can be made firm as compared with a case where the bottom plate is not provided. Therefore, it is possible to realize an electric work vehicle having a firm frame structure.

Furthermore, it is preferable that at least a portion of an electric wire to be connected to the motor is located in a space located above the bottom plate and sandwiched between the two first frames.

With this configuration, at least a portion of the electric wire is protected by the two first frames and the bottom plate. Therefore, there is no need to provide a dedicated member in order to protect the electric wire. Accordingly, the manufacturing cost tends to be reduced.

Furthermore, it is preferable that the bottom plate includes an inspection port, and the electric work vehicle further includes a cover to cover the inspection port and be detachable from the inspection port.

This configuration enables a worker to easily access, through the inspection port, a space located above the bottom plate and sandwiched between the two first frames. Accordingly, operations such as inspection and cleaning of the space can be easily performed.

Furthermore, it is preferable that the electric work vehicle further includes a cab to allow an operator to ride therein, wherein the motor frame is located forward of and below the cab, and the battery extends from a rear end portion to a front portion of the at least one first frame.

With this configuration, the length of the battery in the front-rear direction is relatively large. Consequently, the battery has a relatively large size. Therefore, an electric work vehicle having a relatively large battery capacity can be easily realized.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described with reference to the drawings. In the following description, the arrow F shown in FIGS. 1 to 5 indicates the "forward direction", the arrow B indicates the "rearward direction", the arrow L shown in FIGS. 4 to 6 indicates the "leftward direction", and the arrow R indicates the "rightward direction". The arrow U shown in FIGS. 1 to 3, and 6 indicates the "upward direction", and the arrow D indicates the "downward direction".

Figure 1:
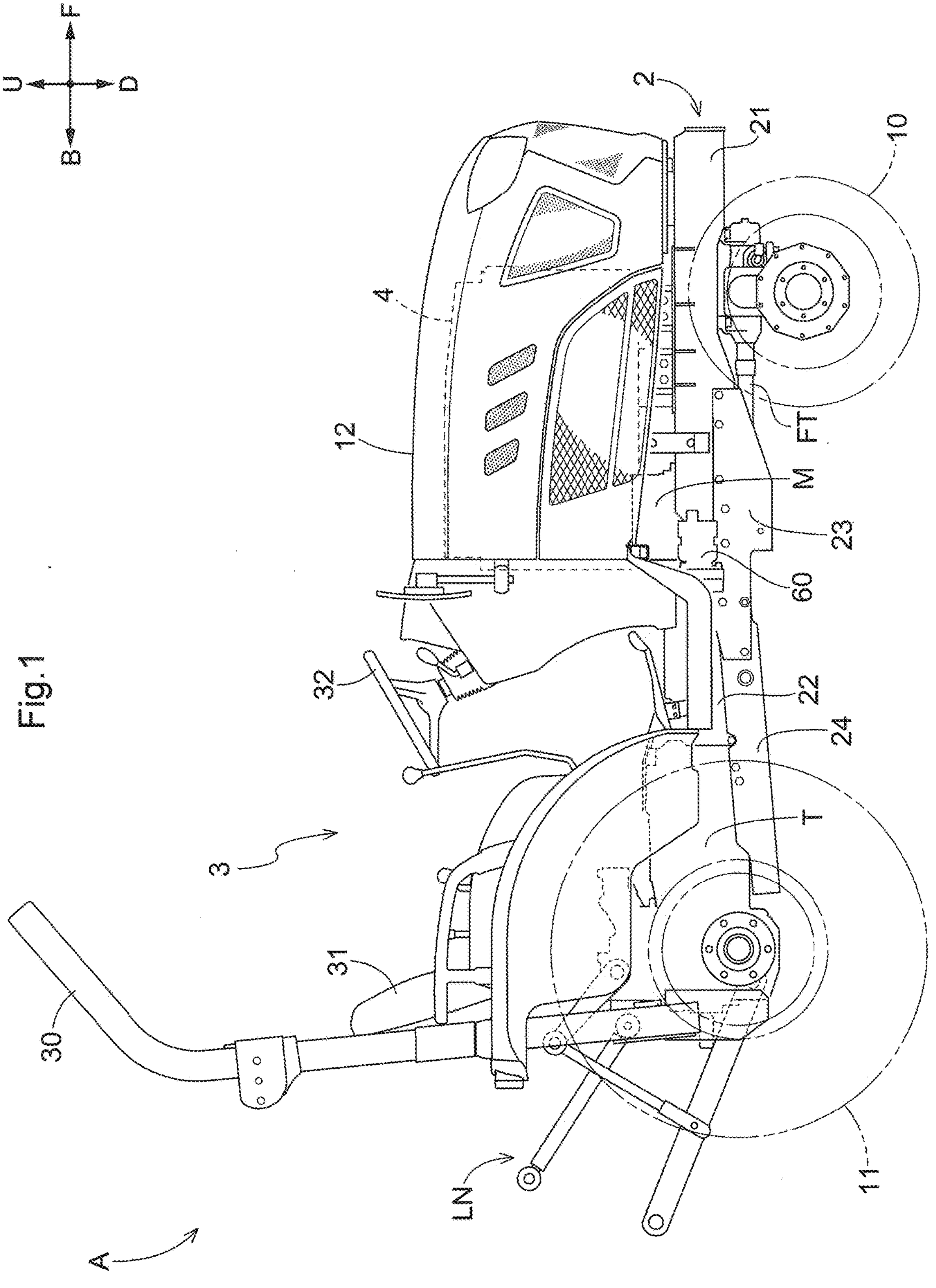
FIG. 1 is a right side view of a tractor.

As shown in FIG. 1, a tractor A (corresponding to an "electric work vehicle" according to a preferred embodiment of the present invention) includes left and right front wheels 10 (each corresponding to a "travel device" according to a preferred embodiment of the present invention), left and right rear wheels 11 (each corresponding to a "travel device" according to a preferred embodiment of the present invention), and a cover 12.

In addition, the tractor A includes a body frame 2 and a cab 3.

The body frame 2 is supported by the left and right front wheels 10 and the left and right rear wheels 11.

The cover 12 is disposed at a front portion of the body. Also, the cab 3 is provided rearward of the cover 12.

The cab 3 includes a protection frame 30, a driver's seat 31, and a steering wheel 32. An operator can sit on the driver's seat 31. This enables the operator to ride in the cab 3. The left and right front wheels 10 can be steered by operating the steering wheel 32. The operator can perform various driving operations in the cab 3.

That is, the tractor A includes a cab 3 configured to allow the operator to ride therein.

In addition, the tractor A includes a travel battery 4 (corresponding to a "battery" according to a preferred embodiment of the present invention), a motor M, a transmission T, and a front transmission mechanism FT.

The cover 12 is configured to swing about an opening and closing axis Q (see FIG. 2) extending in a left-right direction of the body. Thus, the cover 12 is configured to enable opening and closing. Also, while the cover 12 is closed, the travel battery 4 is covered by the cover 12. Also, the travel battery 4 supplies electric power to the motor M.

The motor M is disposed below the travel battery 4. Also, the motor M is driven by the electric power supplied from the travel battery 4. The driving force of the motor M is transmitted to the transmission T.

The transmission T is on the rear side of the travel battery 4 and is disposed rearward of the motor M. The front transmission mechanism FT extends forward from the transmission T. The transmission T changes the speed of the driving force received from the motor M, and transmits the resulting driving force to the left and right rear wheels 11. The driving force is transmitted from the transmission T to the left and right front wheels 10 as well via the front transmission mechanism FT. Thus, the left and right front wheels 10 and the left and right rear wheels 11 are driven.

That is, the tractor A includes the travel battery 4, and a motor M configured to be driven by the electric power supplied from the travel battery 4. In addition, the tractor A includes left and right front wheels 10 and left and right rear wheels 11 that are configured to be driven by the motor M.

As shown in FIG. 1, a link mechanism LN is provided at a rear section of the tractor A. For example, a work device (not shown) such as a cultivator can be coupled to the link mechanism LN.

The transmission T is configured to transmit, to the work device, some of the driving force received from the motor M. Thus, the work device is driven.

With the above-described configuration, the tractor A can perform work using the work device while traveling using the left and right front wheels 10 and the left and right rear wheels 11.

As shown in FIG. 1, the tractor A also includes a hydraulic pump 60. The hydraulic pump 60 is provided on a right side portion of the body. The hydraulic pump 60 is driven by the driving force from the motor M. Also, the hydraulic pump 60 supplies a hydraulic fluid to various parts of the body.

Figure 2:
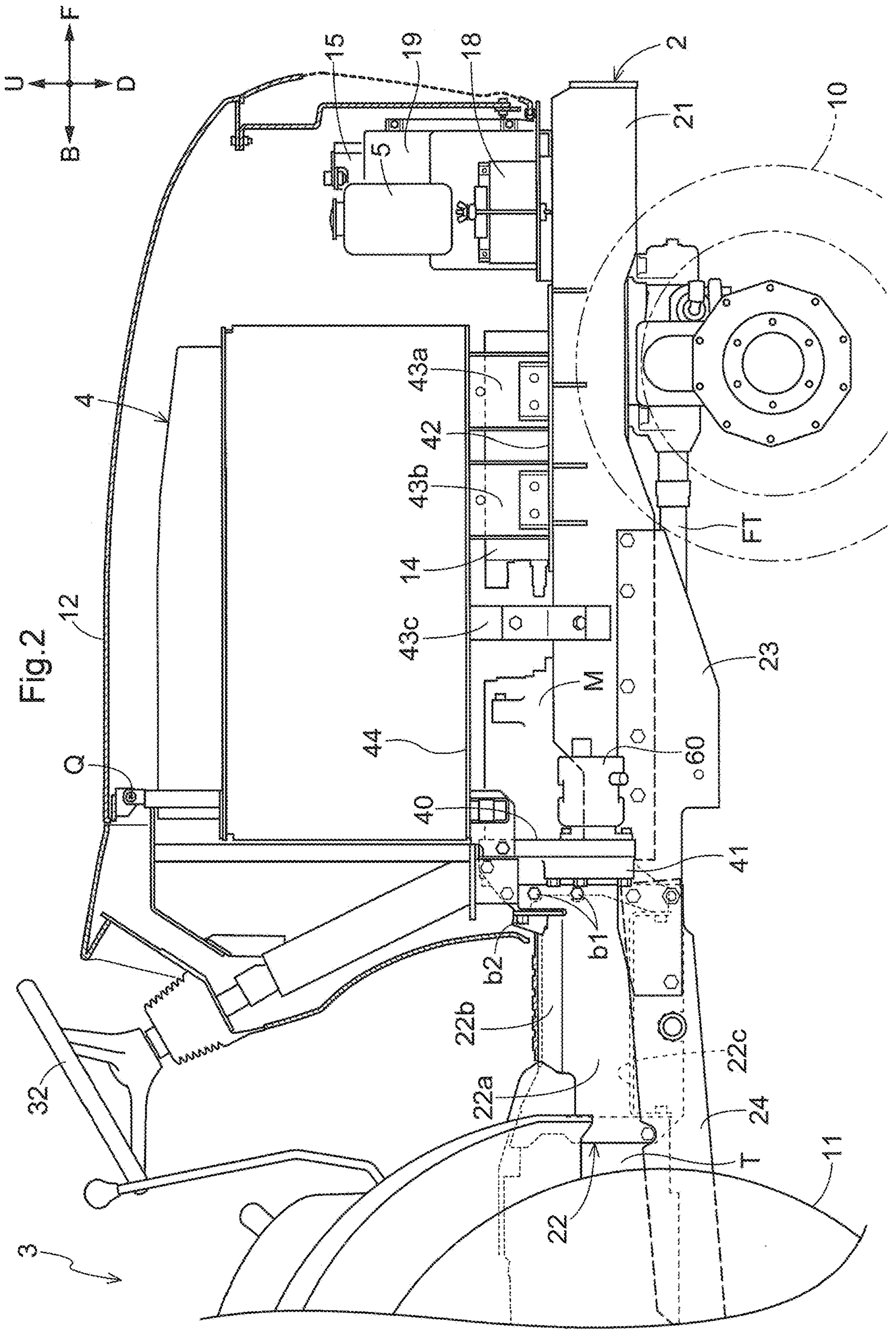
FIG. 2 is a partially cutaway right side view showing configurations of first frames and so forth.
Figure 3:
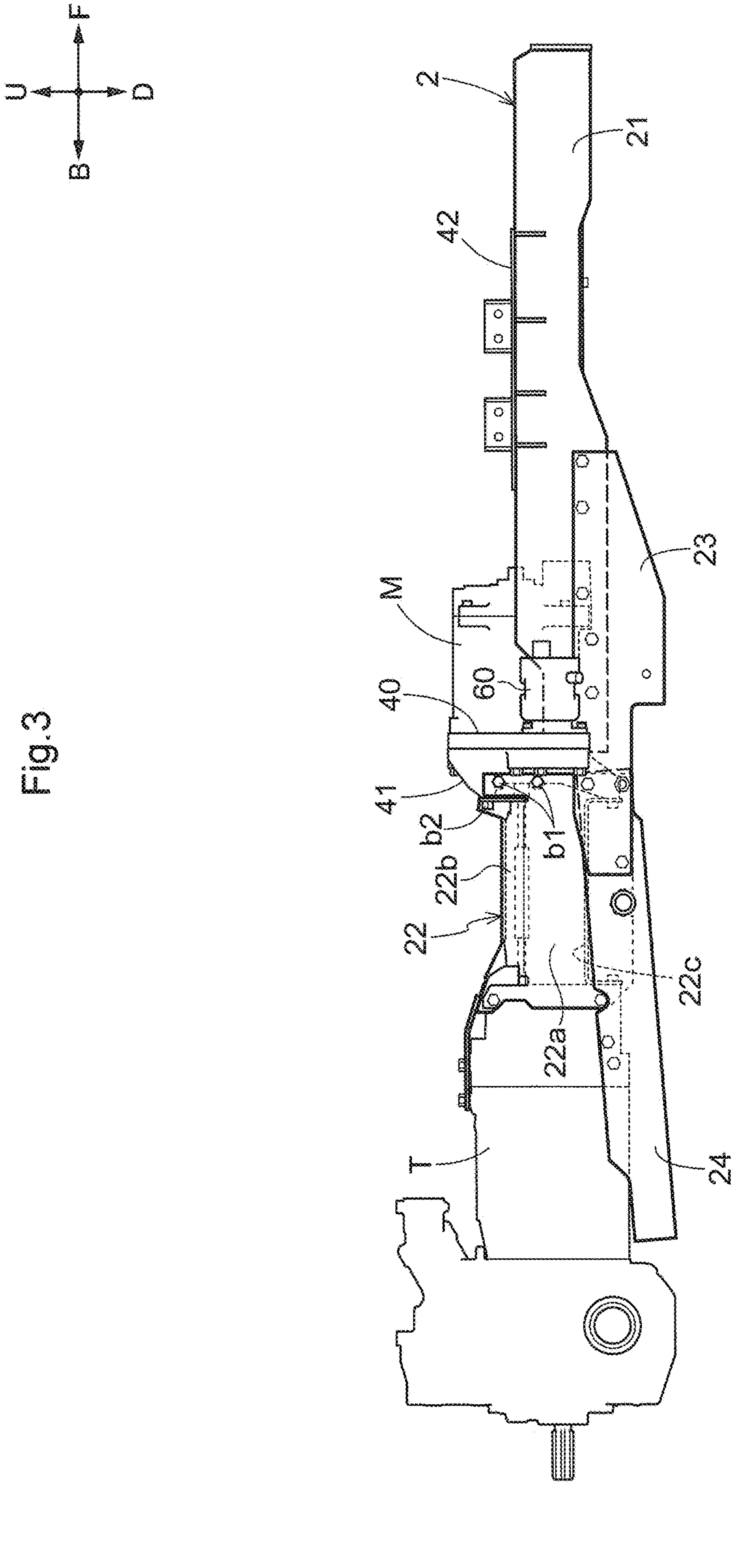
FIG. 3 is a right side view showing configurations of the first frames and so forth.
Figure 4:
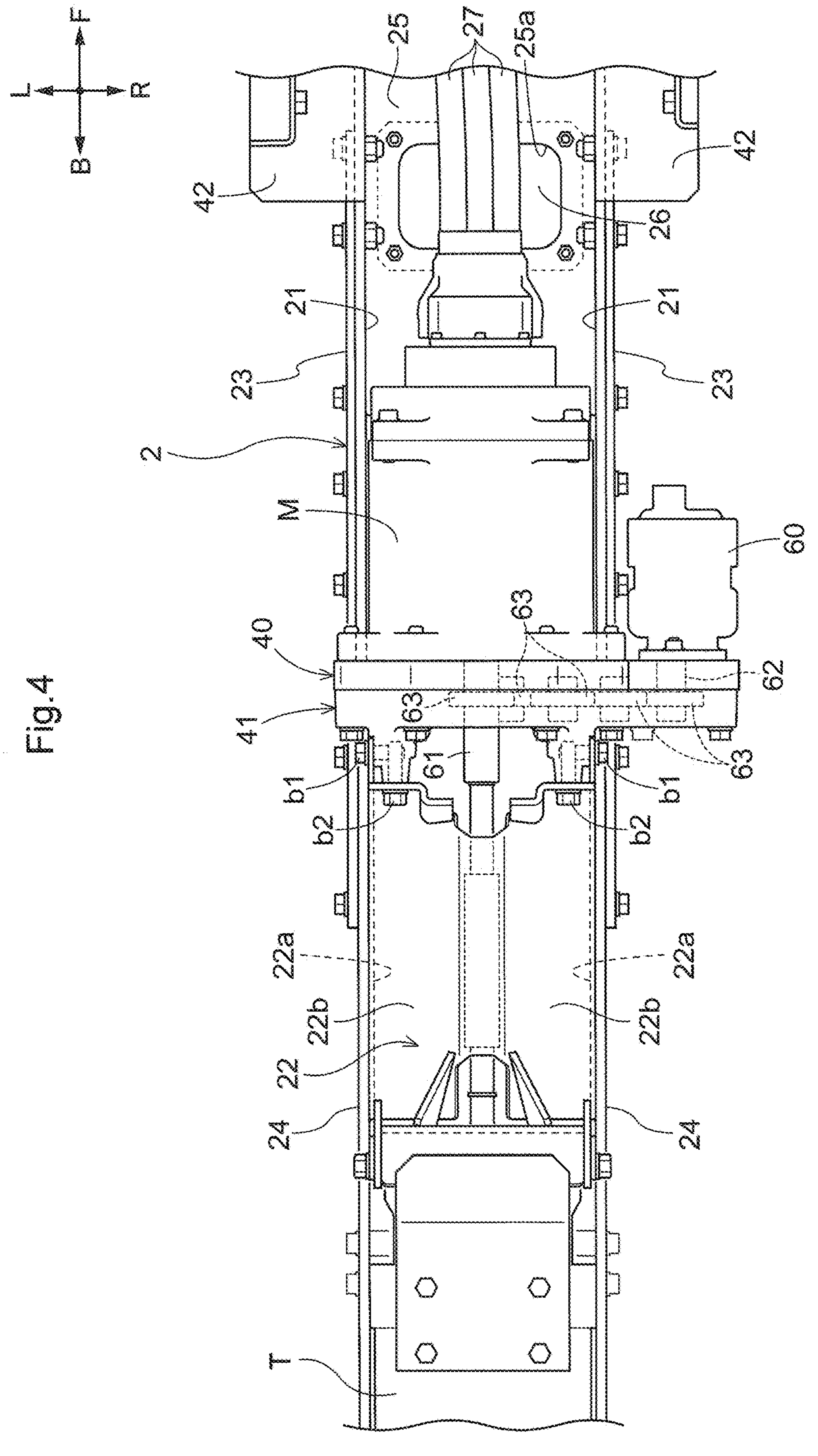
FIG. 4 is a plan view showing configurations of third frames and so forth.

As shown in FIGS. 2 to 4, the body frame 2 includes two first frames 21 extending in the front-rear direction. The two first frames 21 are arranged in the left-right direction of the body.

In this manner, the tractor A includes two first frames 21 arranged in the left-right direction of the body.

As shown in FIG. 2, the tractor A includes a reserve tank 5, an inverter 14, a radiator 15, an auxiliary device battery 18, and a voltage converter 19. While the cover 12 is closed, the reserve tank 5, the radiator 15, the auxiliary device battery 18, and the voltage converter 19 are covered by the cover 12.

The inverter 14 is disposed below the travel battery 4. The inverter 14 converts direct-current power supplied from the travel battery 4 into alternating-current power, and supplies the alternating-current power to the motor M.

The reserve tank 5 can store cooling water.

The radiator 15 and a water pump (not shown) are provided on a cooling water path of the tractor A. As a result of the water pump pumping cooling water, the cooling water is circulated along the cooling water path. Then, the cooling water is cooled by passing through the radiator 15.

The auxiliary device battery 18 supplies electric power to various types of auxiliary devices. Also, electric power is transmitted from the travel battery 4 to the voltage converter 19. The voltage converter 19 steps down the electric power supplied from the travel battery 4, and supplies the resulting electric power to the auxiliary device battery 18.

As shown in FIG. 2, the travel battery 4 and the inverter 14 are supported by the two first frames 21.

More specifically, as shown in FIGS. 2 to 5, an inverter support 42 is supported by each of the first frames 21. The inverter support 42 is a horizontally oriented plate-shaped structure. The inverter 14 is placed on the two inverter supports 42.

As shown in FIG. 2, a first support 43*a* and a second support 43*b* are supported by each of the inverter supports 42. A third support 43*c* is supported by each of the first frames 21. Also, a battery support 44 is supported by the first supports 43*a*, the second supports 43*b*, and the third supports 43*c*. The battery support 44 is a horizontally oriented plate-shaped structure. In addition, the battery support 44 extends across left and right ends of the travel battery 4. The travel battery 4 is placed on the battery support 44.

In this manner, the tractor A includes the first frames 21 extending in the front-rear direction of the body, and configured to support the travel battery 4.

As shown in FIG. 2, the travel battery 4 extends from a rear end portion to a front portion of the first frame 21.

The reserve tank 5, the radiator 15, the auxiliary device battery 18, and the voltage converter 19 are also supported by the two first frames 21.

As shown in FIGS. 2 to 4, the body frame 2 includes a motor frame 40. The motor frame 40 is a plate-shaped structure. The motor frame 40 is disposed perpendicular to the direction in which the first frames 21 extend. The motor frame 40 is coupled to the respective rear end portions of the first frames 21 through welding. The motor frame 40 is located forward of and below the cab 3.

The motor frame 40 is in contact with a rear end portion of the motor M. The motor M is attached to the motor frame 40 from the front side. That is, the motor frame 40 supports the rear end portion of the motor M.

In this manner, the tractor A includes the motor frame 40 configured to be coupled to the rear portions of the first frames 21, and support the motor M.

The hydraulic pump 60 is attached to the motor frame 40 from the front side. Thus, the hydraulic pump 60 is supported by the motor frame 40.

A gear case 41 is provided rearward of the motor frame 40. The gear case 41 is coupled to the motor frame 40 using bolts. As shown in FIG. 4, the gear case 41 houses one or more gears 63 each configured to be rotated by the driving force of the motor M. In the present preferred embodiment, five gears 63 are provided. The driving force is transmitted from a motor output shaft 61 serving as an output shaft of the motor M to a pump input shaft 62 serving as an input shaft of the hydraulic pump 60 via the five gears 63.

In this manner, the tractor A includes the gear case 41 located rearward of the motor frame 40 and coupled to the motor frame 40.

As shown in FIGS. 2 to 4, the body frame 2 includes a second frame 22, and two fourth frames 24. All of the second frame 22 and the fourth frames 24 extend in the front-rear direction of the body. All of the second frame 22 and the fourth frames 24 are located rearward of the first frames 21.

In this manner, the tractor A includes the second frame 22 extending in the front-rear direction of the body and located rearward of the first frames 21.

The second frame 22 includes left and right longitudinal plates 22*a*, a top plate 22*b*, and a lateral plate 22*c*. The top plate 22*b* extends across an upper end portion of the left longitudinal plate 22*a* and an upper end portion of the right longitudinal plate 22*a*. The lateral plate 22*c* extends across an intermediate portion of the left longitudinal plate 22*a* in the up-down direction and an intermediate portion of the right longitudinal plate 22*a* in the up-down direction. The motor output shaft 61 passes through a space surrounded by the left and right longitudinal plates 22*a*, the top plate 22*b*, and the lateral plate 22*c*.

As shown in FIG. 4, the respective front end portions of the left and right longitudinal plates 22*a* are fastened to the gear case 41 using first fasteners b1. Also, a front end portion of the top plate 22*b* is fastened to the gear case 41 using second fasteners b2.

The axial direction of the first fasteners b1 extends in the left-right direction of the body. The axial direction of the second fasteners b2 extends in the front-rear direction of the body. That is, the axial direction of the first fastener b1 and the axial direction of the second fasteners b2 are different from each other.

In this manner, the tractor A includes the first fasteners b1 and the second fasteners b2 each configured to fasten the front end portion of the second frame 22 to the gear case 41. In the present preferred embodiment, all of the first fastener b1 and the second fasteners b2 are bolts.

With the above-described configuration, the front end portion of the second frame 22 is coupled to the motor frame 40 via the gear case 41. That is, the front end portion of the second frame 22 is coupled to the motor frame 40.

Figure 5:
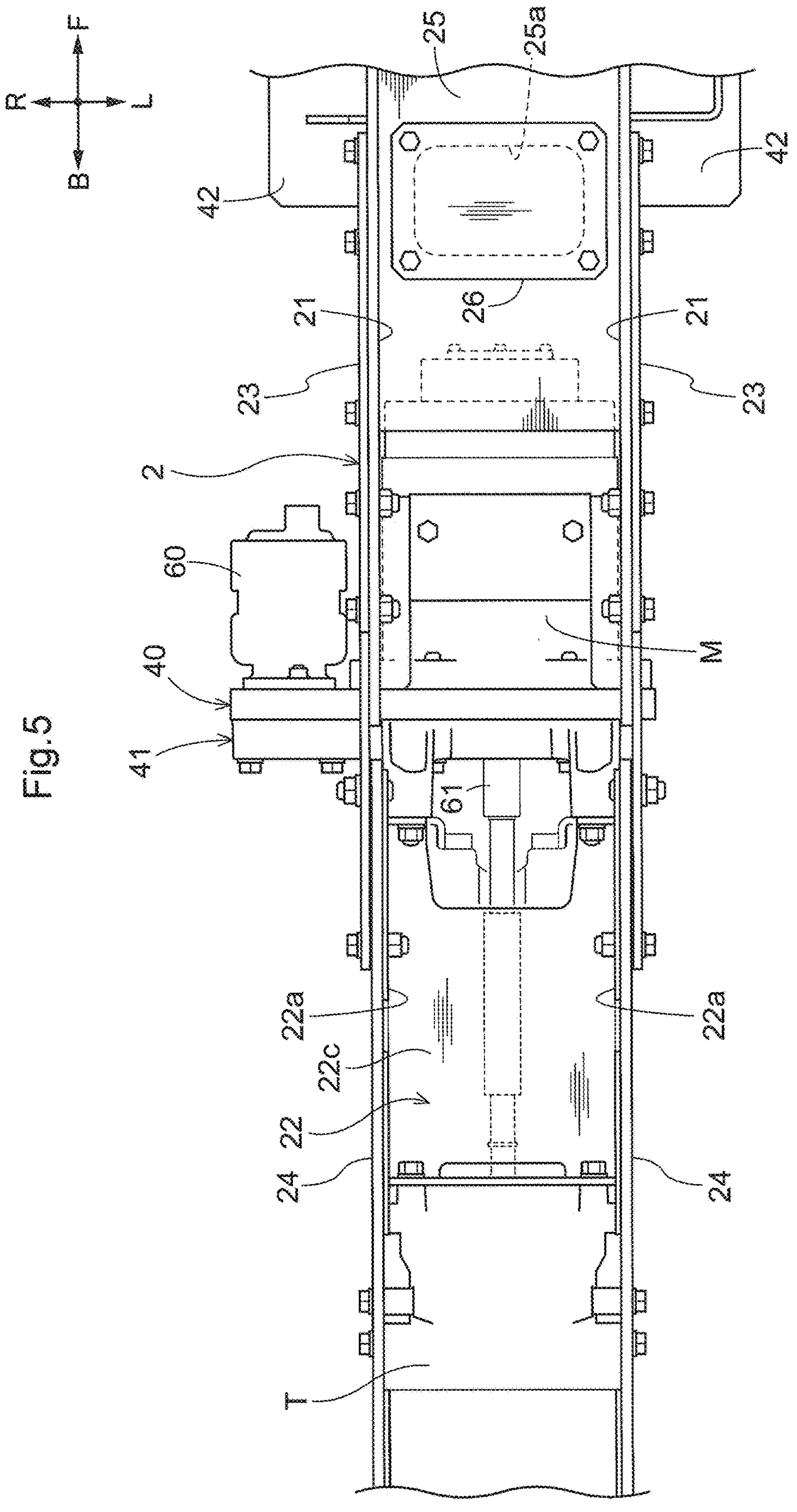
FIG. 5 is a bottom view showing configurations of the third frames and so forth.

As shown in FIGS. 4 and 5, the two fourth frames 24 are arranged in the left-right direction of the body. Each of the fourth frames 24 is a plate-shaped structure, and is oriented to oppose the corresponding longitudinal plate 22*a*. The second frame 22 is sandwiched between the two fourth frames 24. As shown in FIG. 4, a front portion of the transmission T is sandwiched between the two fourth frames 24 in a plan view.

The left fourth frame 24 is coupled to the left longitudinal plate 22*a* using a bolt. The right fourth frame 24 is coupled to the right longitudinal plate 22*a* using a bolt.

As shown in FIGS. 2 to 4, the body frame 2 includes two third frames 23. The two third frames 23 are arranged in the left-right direction of the body. Each of the third frames 23 is a plate-shaped structure oriented perpendicular to the ground, and extends in the front-rear direction of the body.

The left third frame 23 is located toward the left side of the body relative to the left first frame 21, the left longitudinal plate 22*a*, and the left fourth frame 24. The left third frame 23 is oriented to oppose the left first frame 21, the left longitudinal plate 22*a*, and the left fourth frame 24.

The right third frame 23 is located toward the right side of the body relative to the right first 21, the right longitudinal plate 22*a*, and the right fourth frame 24. The right third frame 23 is oriented to oppose the right first frame 21, the right longitudinal plate 22*a*, and the right fourth frame 24.

As shown in FIG. 2, each of the third frames 23 overlaps the corresponding first frame 21, the corresponding longitudinal plate 22*a*, and the corresponding fourth frame 24 in a side view. Also, the left third frame 23 is coupled to the left first frame 21, the left longitudinal plate 22*a*, and the left fourth frame 24 using bolts. The right third frame 23 is coupled to the right first frame 21, the right longitudinal plate 22*a*, and the right fourth frame 24 using bolts.

In this manner, the tractor A includes the third frames 23 overlapping the respective corresponding first frames 21 and the second frame 22 in a side view, and coupled to the respective corresponding first frames 21 and the second frame 22.

Figure 6:
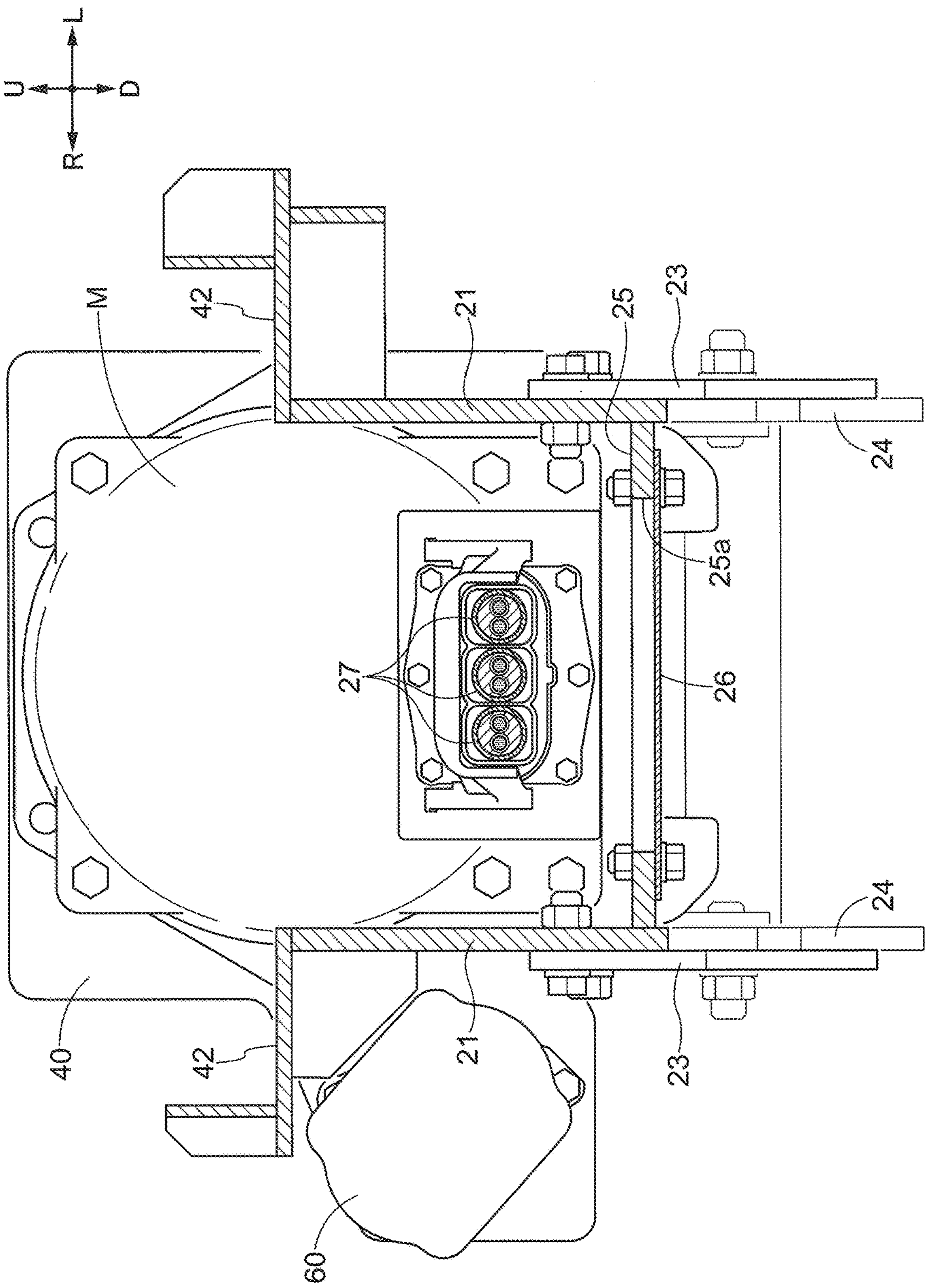
FIG. 6 is a longitudinal sectional front view showing configurations of a bottom plate and so forth.

As shown in FIGS. 4 to 6, the body frame 2 includes a bottom plate 25. The bottom plate 25 is a horizontally oriented plate-shaped structure. The bottom plate 25 is coupled to the two first frames 21 to extend across a lower portion of the left first frame 21 and a lower portion of the right first frame 21.

In this manner, the tractor A includes the bottom plate 25 coupled to the two first frames 21 to extend across a lower portion of the left first frame 21 and a lower portion of the right first frame 21.

As shown in FIGS. 4 and 6, a plurality of electric wires 27 are connected to the motor M. Alternating-current power supplied from the inverter 14 is supplied to the motor M via the electric wires 27. Also, at least portions of the electric wires 27 connected to the motor M are located in a space located above the bottom plate 25 and sandwiched between the two first frames 21. Note that the whole of the electric wires 27 may be located in the space, or only portions of the electric wires 27 may be located in the space.

As shown in FIGS. 4 to 6, the bottom plate 25 includes an inspection port 25*a*. A cover 26 is attached to the inspection port 25*a* using bolts and nuts so as to be detachable from the inspection port 25*a*. The cover 26 is positioned to cover the inspection port 25*a*.

In this manner, the tractor A includes the cover 26 configured to cover the inspection port 25*a* and be detachable from the inspection port 25*a*.

With the above-described configuration, the first frames 21 and the second frame 22 are coupled to each other via the third frames 23. Accordingly, stress is less likely to be concentrated on a coupling portion between each of the first frames 21 and the motor frame 40 as compared with a case where the tractor A does not include the third frames 23 and has a frame structure in which the front end portion of the second frame 22 is coupled to the motor frame 40.

Therefore, with the above-described configuration, it is possible to realize a tractor A that can reduce or prevent concentration of stress on a coupling portion between each of the first frames 21 and the motor frame 40, using a relatively simple configuration.

Other Preferred Embodiments (1) The tractor A may be configured as a hybrid tractor including an engine.

(2) The second frame 22 may be directly coupled to the first frames 21 without the motor frame 40 interposed therebetween.

(3) The second frame 22 may be directly coupled to the motor frame 40 without the gear case 41 interposed therebetween.

(4) The axial directions of all of the fasteners that fasten the front end portion of the second frame 22 to the gear case 41 may be the same.

(5) One first frame 21 may be provided, or three or more first frames 21 may be provided.

(6) The whole of the electric wires 27 may be located outside a space located above the bottom plate 25 and sandwiched between the two first frames 21.

(7) The cover 26 need not be attached to the inspection port 25*a*.

(8) The size of the travel battery 4 relative to the first frames 21 may be either larger or smaller than the size described in the above preferred embodiment.

(9) The gear case 41 may house four or less gears 63, or six or more gears 63.

(10) Positions of some or all of the members may be inverted in the left-right direction.

Note that the configurations disclosed in the preferred embodiments described above (including the alternative preferred embodiments, the same applies to the following) are applicable in combination with configurations disclosed in other preferred embodiments so long as no inconsistency arises. The preferred embodiments disclosed herein are illustrative, and preferred embodiments of the present invention are not limited thereto. Appropriate changes and modifications may be made without departing from the scope and sprit of the present invention.

Preferred embodiments of the present invention are applicable not only to tractors, but also to various electric work vehicles such as combines, rice planters, and construction machines.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An electric work vehicle comprising:

a battery;

a motor to be driven by electric power supplied from the battery;

wheels to be driven by the motor;

at least one first frame extending in a front-rear direction of a body of the electric work vehicle to support the battery;

a motor frame to be coupled to a rear portion of the at least one first frame to support the motor;

a second frame extending in the front-rear direction of the body and located rearward of the at least one first frame; and a third frame overlapping the at least one first frame and the second frame in a side view, and coupled to the at least one first frame and the second frame; wherein a front end of the second frame is behind a rear end of the first frame;

a front end of the first frame is in front of a front end of the motor; and a rear end of the second frame is behind a rear end of the motor.

2. The electric work vehicle according to claim 1, wherein a front end portion of the second frame is coupled to the motor frame.

3. An electric work vehicle comprising:

a battery;

a motor to be driven by electric power supplied from the battery;

wheels to be driven by the motor;

at least one first frame extending in a front-rear direction of a body of the electric work vehicle to support the battery;

a motor frame to be coupled to a rear portion of the at least one first frame to support the motor;

a second frame extending in the front-rear direction of the body and located rearward of the at least one first frame;

a third frame overlapping the at least one first frame and the second frame in a side view, and coupled to the at least one first frame and the second frame; and a gear case located rearward of the motor frame and coupled to the motor frame; wherein a front end portion of the second frame is coupled to the motor frame;

the gear case houses one or more gears each to be rotated by driving force of the motor; and the front end portion of the second frame is coupled to the motor frame via the gear case.

4. The electric work vehicle according to claim 3, further comprising:

a first fastener and a second fastener each to fasten the front end portion of the second frame to the gear case; wherein the first fastener and the second fastener have axial directions different from each other.

5. The electric work vehicle according to claim 1, wherein the at least one first frame includes a plurality of first frames;

the plurality of first frames include two first frames arranged in the left-right direction of the body; and the electric work vehicle further comprises a bottom plate coupled to the two first frames to extend across a lower portion of the left first frame and a lower portion of the right first frame.

6. The electric work vehicle according to claim 5, wherein at least a portion of an electric wire to be connected to the motor is located in a space above the bottom plate and sandwiched between the two first frames.

7. The electric work vehicle according to claim 5, wherein the bottom plate includes an inspection port; and the electric work vehicle further comprises a cover to cover the inspection port and be detachable from the inspection port.

8. The electric work vehicle according to claim 1, further comprising:

a cab to allow an operator to ride therein; wherein the motor frame is located forward of and below the cab; and the battery extends from a rear end portion to a front portion of the at least one first frame.

9. The electric work vehicle according to claim 1, wherein a front end of the third frame is in front of the front end of the motor; and a rear end of the third frame is behind the rear end of the motor.

* * * * *